(12) United States Patent
Wiegand et al.

(10) Patent No.: US 6,807,231 B1
(45) Date of Patent: Oct. 19, 2004

(54) MULTI-HYPOTHESIS MOTION-COMPENSATED VIDEO IMAGE PREDICTOR

(75) Inventors: Thomas Wiegand, Erlangen (DE); Bernd Girod, Spardorf (DE); Markus Flierl, Erlangen (DE)

(73) Assignee: 8×8, Inc., Santa Clara, CA (US)

( * ) Notice: Subject to any disclaimer, the term of this patent is extended or adjusted under 35 U.S.C. 154(b) by 0 days.

(21) Appl. No.: 09/148,367

(22) Filed: Sep. 4, 1998

Related U.S. Application Data

(63) Continuation-in-part of application No. 08/928,356, filed on Sep. 12, 1997, now Pat. No. 6,249,318.

(51) Int. Cl.$^7$ .................................................. H04B 1/66

(52) U.S. Cl. .............................. 375/240.12; 375/240.14

(58) Field of Search ......................... 375/240.12–240.17

(56) References Cited

U.S. PATENT DOCUMENTS

| | | | | |
|---|---|---|---|---|
| 5,093,720 A | * | 3/1992 | Krause et al. ......... | 375/240.17 |
| 5,459,515 A | * | 10/1995 | Chevance et al. ..... | 375/240.03 |
| 5,594,813 A | | 1/1997 | Fandrianto et al. | |
| 5,633,728 A | * | 5/1997 | Tachihara et al. ........... | 358/429 |
| 6,005,627 A | * | 12/1999 | Odaka et al. .......... | 375/240.12 |

OTHER PUBLICATIONS

Linde, J. et al., "An Algorithm for Vector Quantizer Design," IEEE Transactions on Communications, vol. Com.28, No. 1, pp. 84–95 (Jan. 1980).

"An Error Resilience Method Based on Back Channel Signalling and FEC", *ITU Telecommunication Standardization Sector, Stuty Group 15, Working Party 15/1, Expert's Group on Very Low Bitrate Video Telephony*: 6 pages (Jan. 1996).

"Core Experiment N3: Dynamic Sprite and Global Motion Compensation", 1–17 (Undated).

"Proposal for Efficient Coding", *International Organisation for Standardisation Organisation Internationale De Normalisation ISO/IEC JTC1/SC29/WG11 Coding of Moving Pictures and Audio*: 42 pages (Jul. 1996).

"Transmission of Non–Telephone Signals: Video Coding for Low Bit Rate Communication", *International Telecommunication Union, ITU–T Draft H.263,*: 149 pages (Sep. 26, 1997).

Chou, P. et al., "Entropy–Constrained Vector Quantization", *IEEE Transactions of Acoustics, Speech, and Signal Processing*, 37(1): 31–42 (Jan. 1989).

Girod, B., "Motion–Compensating Prediction with Fractional–Pel Accuracy", *IEEE Transactions on Communications*, 41(4): 604–612 (Apr. 1993).

Girod, B., "Rate–Constrained Motion Estimation", *SPIE Symposium on Visual Communications and Image Processing* 94: 1–9 (Sep. 1994).

Hepper, D. "Efficiency Analysis and Application of Uncovered Background Prediction in a Low Bit Rate Image Coder", *IEEE Transactions on Communications*, 38(9): 1578–1584 (Sep. 1990).

(List continued on next page.)

*Primary Examiner*—Andy Rao

(57) ABSTRACT

Video images are communicated between two stations using a method for predicting motion uses up to N frames of the video data, where N is a positive integer and each frame is represented as a plurality of image segments. According to one implementation, combined are at least two spatial displaced image segments from previously decoded frames corresponding to time instances on one side of a temporal axis; and the video data is communicated using the spatial displaced image segments along with corresponding delays as side information. Other aspects of the disclosure include combining using a Lagrangian cost function, and an iterative search method to minimize Lagrangian cost function.

22 Claims, 7 Drawing Sheets-

OTHER PUBLICATIONS

Kasahara, T., "Core Experiments on Macroblock–Partitioning for Motion Prediction (P2)" and "Core Experiments on STFM/LTFM for Motion Prediction (P3)": 1–25 (Undated).

Orchard, M. et al., "Overlapping Block Motion Compensation: An Estimation–Theoretic Approach", *IEEE Transactions on Image Processing*, 3(5): 693–699 (Sep. 1994).

Stuhlmuller, K. et al., "Rate–Constrained Countour–Representation for Region–Based Motion Compensation", 12 pages, (Undated).

Sullivan, G. et al., "Efficient Quadtree Coding of Images and Video", *IEEE Transactions on Image Processing*, 3(3): 327–331 (May 1994).

Wang, J. et al., "Representing Moving Images with Layers", *IEEE Transactions on Image Processing*, 3(5): 625–638 (Sep. 1994).

Wiegand, T. et al., "Motion–Compensating Long–Term Memory Prediction", *Telecommunications Institute, University of Erlangen–Nuremberg, Erlangen, Germany*, 4 pages (Undated).

Wiegand, T. et al., "Block–Based Hybrid Video Coding Using Motion–Compensated Long–Term Memory Prediction", *Telecommunications Institute, University of Erlangen– Nuremberg, Erlangen, Germany*, 6 pages (Undated).

Wiegand, T. et al., "Entropy–Constrained Design of Quadtree Video Coding Schemes", *University of Erlangen– Nuremberg, Germany*, 5 pages (Undated).

"Line Transmission of Non–Telephone Signals," *International Telecommunication Union, ITU–T, H.261*: 35 pages (Mar. 1993).

"Draft Text of Recommendation H.263 Version 2 ("H.263+") for Decision," Study Group 16 –Contribution Com–999, International Telecommunication Union, ITU–T: 162 pages (Jan. 27, 1998).

* cited by examiner

0: Assuming n-hypotheses, the rate-distortion measure $$j(c_1,\ldots,c_\mu,\ldots,c_n) = \left\| s - \sum_{\substack{v=1 \\ v\neq\mu}}^{n} c_v h_v - c_\mu h_\mu \right\|_2^2 + \lambda \left( \sum_{\substack{v=1 \\ v\neq\mu}}^{n} |\gamma(c_v)| + |\gamma(c_\mu)| \right)$$

is subject to minimization for each original block s. Select the entropy code $\gamma$, predictor coefficients h, and the Lagrange multiplier $\lambda$. Initialize the algorithm with n hypotheses $(c_1^{(0)},\ldots,c_n^{(0)})$ and set i:=0.

1: Select the $\mu$-th out of n hypotheses; start from the first and end with the n-th hypothesis.

a: Focus on the $\mu$-th out of n hypotheses. All others are kept constant. Select a local neighborhood of hypothesis $c_\mu^{(i)}$ as the conditional search space of hypothesis $c_\mu^{(i+1)}$.

b: Minimize the rate-distortion measure by full search within the conditional search space of hypothesis $c_\mu^{(i+1)}$.

$$\min_{c_\mu^{(i+1)}} j(c_1^{(i+1)},\ldots,c_{\mu-1}^{(i+1)},c_\mu^{(i+1)},c_{\mu+1}^{(i)},\ldots,c_n^{(i)})$$

2: As long as the rate-distortion measure decreases, continue with step 1 and set i := i+1.

*FIG.3*

MULTI-HYPOTHESIS MOTION-COMPENSATED VIDEO IMAGE PREDICTOR

RELATED APPLICATION

This is a continuation-in-part of U.S. patent application Ser. No. 08/928,356, now U.S. Pat. No. 6,249,318, entitled "Long-Term Prediction Arrangement for Low Bit Rate," filed on Sep. 12, 1997, and incorporated herein by reference.

FIELD OF THE INVENTION

This invention relates to compression and transmission of video signals and, more particularly, to encoding and decoding temporal redundant information present in video signals.

BACKGROUND OF THE INVENTION

Video signals can be digitized, encoded, and subsequently decoded in a manner which significantly decreases the number of bits necessary to represent a decoded reconstructed video without noticeable, or with acceptable, degradation in the reconstructed video. Video coding is an important part of many applications such as digital television transmission, video conferencing, video database, etc.

In video conferencing applications, for example, a video camera is typically used to capture a series of images of a target, such as a meeting participant or a document. The series of images is encoded as a data stream and transmitted over a communications channel to a remote location. For example, the data stream may be transmitted over a phone line, an integrated services digital network (ISDN) line, or the Internet.

The encoding process is typically implemented using a digital video coder/decoder (codec), which divides the images into blocks and compresses the blocks according to a video compression standard, such as the ITU-T H.263 and H.261 standards. In standards of this type, a block may be compressed independent of the previous image or as a difference between the block and part of the previous image. In a typical video conferencing system, the data stream is received at a remote location, where it is decoded into a series of images, which may be viewed at the remote location. Depending on the equipment used, this process typically occurs at a rate of one to thirty frames per second.

One technique widely used in video systems is hybrid video coding. An efficient hybrid video coding system is based on the ITU-T Recommendation H.263. The ITU-T Recommendation H.263 adopts a hybrid scheme of motion-compensated prediction to exploit temporal redundancy and transform coding using the discrete cosine transform (DCT) of the remaining signal to reduce spatial redundancy. Half pixel precision is used for the motion compensation, and variable length coding is used for the symbol representation.

With the above-mentioned coding algorithm, fifteen negotiable coding options can be used, either together or separately. The motion compensation (MC) is often carried out by employing the immediately preceding image which is available as a reconstructed image at encoder and decoder. While long-term statistical dependencies in the coded video sequence have not been fully exploited in existing international standards for improving coding efficiency, a specified negotiable coding option called "Reference Picture Selection Mode" (RPS mode) permits a modified inter-picture prediction called "NEWPRED". This prediction is intended to stop temporal error propagation due to errors. Transmission errors cause different results of the decoding process at encoder and decoder, thereby leading to differently and inconsistently reconstructed frames. The RPS mode can use backward channel messages sent from a decoder to an encoder to inform the encoder which part of which pictures have been correctly decoded at the decoder. The encoder may select one of the picture memories to suppress the temporal error propagation due to the inter-frame coding. A particular picture memory is selected as reference for inter-frame coding of a complete picture, which is represented as a "group of blocks" or a "slice" as specified in the H.263 document. The amount of additional picture memory accommodated in the decoder may be signaled by external means as specified in the ITU-T Recommendations.

The RPS mode is designed to suppress the temporal error propagation due to the inter-frame coding which occurs in case of transmission errors. Techniques that use multiple reference picture in order to achieve the additional goal of improving coding efficiency are being analyzed within the MPEG-4 standardization group. These techniques include schemes known as "Sprites," "Global Motion Compensation," "Short-Term Frame Memory/Long-Term Frame Memory" and "Background Memory" prediction. A commonality of these techniques is that the video encoder can choose between the immediately preceding reconstructed picture and a second picture, either being generated by the prediction technique. While the use of more than a second picture has been exploited when combining various ones of the above techniques, the selection among the reference pictures has been a heuristic approach leading only to small coding gains.

Generally, motion-compensated coding schemes achieve data compression by exploiting the similarities between successive frames of a video signal. Often, with such schemes, motion-compensated prediction (MCP) is combined with intraframe encoding of the prediction error. Successful applications range from digital video broadcasting to low rate videophones. Several standards, such as ITU-T H.263, are based on this scheme.

Many codecs today employ more than one motion-compensated prediction signal simultaneously to predict the current frame. The term "multi-hypothesis motion compensation" has been generally used to refer to this approach. A linear combination of multiple prediction hypotheses is formed to arrive at the actual prediction signal. Examples are the combination of past and future frames to predict B-frames or overlapped block motion compensation in the MPEG or H.263 coding schemes. Multi-hypothesis motion-compensated prediction extends traditional motion-compensated prediction used in video coding schemes. Known algorithms for block-based multi-hypothesis motion-compensated prediction are, for example, overlapped block motion compensation (OBMC) and bi-directionally predicted frames (B-frames). While there have been some advances made using multi-hypothesis motion compensation, the need to further increase coding gains continues.

SUMMARY

According to various aspects of the present invention, embodiments thereof are exemplified in the form of motion-prediction methods and arrangements in connection with encoding, decoding and performing video conferencing. One specific implementation is directed to a method for predicting an image segment using up to N reference pictures (or frames) of the video data in a compression/decompression communication arrangement, where N is a positive integer greater than one and each reference picture can be represented as a plurality of image segments. The method comprises: selecting at least two spatially-displaced image segments from previously decoded reference pictures corresponding to time instances on one side of a temporal axis; and forming a predictor signal by combining the selected spatially-displaced image segments.

More particular aspects of the present invention are directed to implementations using one or more of the following: forming a Lagrangian cost function for selecting the prediction code; obtaining the Lagrangian cost function as a weighted sum of a distortion measure and a rate measure; obtaining the distortion measure as a function of the image segment to be predicted and the multi-hypothesis prediction signal; obtaining the rate measure as a function of the codes for transmission of the multi-hypothesis predictor; transmitting the multi-hypothesis prediction codes to the decoder; forming a prediction signal by combining the image segments that are addressed by the multi-hypothesis prediction code.

Another more particular embodiment of the present invention is directed to searching iteratively in order to select the spatially-displaced image segments and corresponding delays in an effort to minimize the Lagrangian cost function. The iterative searching, according to another particular example embodiment of the present invention, includes: (a) fixing all but one image segment and changing the one image segment and its corresponding delay parameter to reduce the Lagrangian cost function; (b) using the changed image segment and its corresponding delay parameter, repeating the step of fixing and changing for each remaining image segment; and (c) repeating step (a) and (b).

Among other aspects of the present invention, example embodiments are directed to various arrangement implementations relating to the above method.

The above summary is not intended to provide an overview of all aspects of the present invention. Other aspects of the present invention are exemplified and described in connection with the detailed description.

BRIEF DESCRIPTION OF THE DRAWINGS

Various aspects and advantages of the present invention will become apparent upon reading the following detailed description of various embodiments and upon reference to the drawings in which:

FIG. 3 is a flow diagram showing an example selection operation for motion-compensated prediction, according to the present invention;

Figure 1:
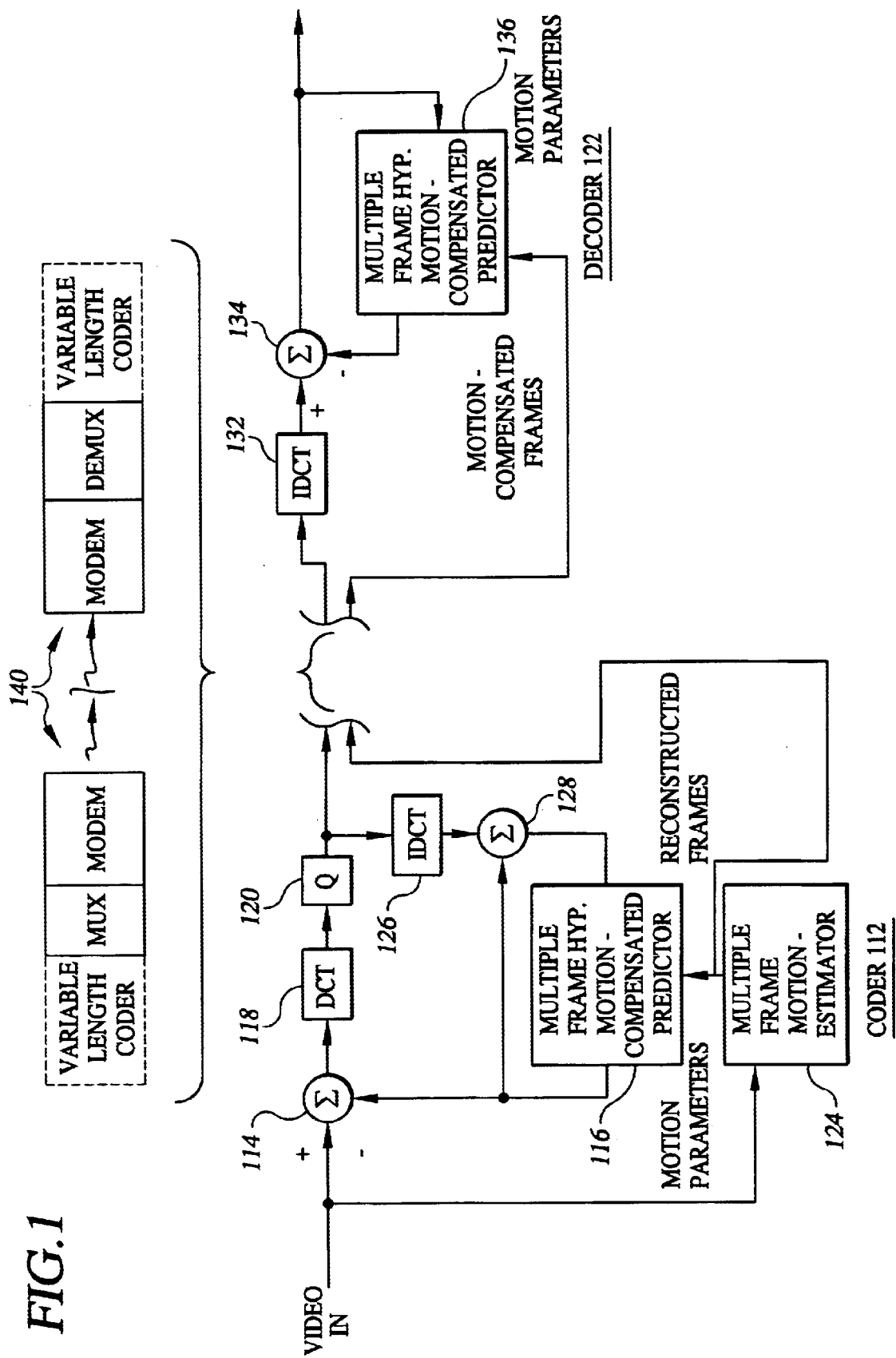
FIG. 1 illustrates a block diagram of a digital video coding system, according to an example embodiment of the present invention.

While the invention is amenable to various modifications and alternative forms, specifics thereof have been shown by way of example in the drawings and will be described in detail. It should be understood, however, that the intention is not to limit the invention to any particular embodiment described. On the contrary, the invention is to cover all modifications, equivalents, and alternatives falling within the spirit and scope of the invention as defined by the appended claims.

DETAILED DESCRIPTION

The present invention is applicable to a variety of systems and arrangements that transmit and receive images. The present invention has been found to be particularly advantageous in video systems, such as video conferencing applications, in which images are coded and decoded and transmission efficiency is benefited by motion compensated prediction. While the present invention is not so limited, an appreciation of various aspects of the invention may be obtained through a discussion of various application examples operating in such an environment.

Using a video conferencing system to illustrate an example environment of a video system benefiting from application of the present invention, each of first and second video conferencing stations may include a first terminal that receives and displays images. The images are processed by a codec in the terminal and are transmitted over a communications channel. The second video conferencing station, which may or may not be constructed with the same capabilities as the first video conferencing station, then receives the images over the communications channel and decodes and displays the images. Respective sets of multiple reference pictures are provided at the first and second stations to permit use of up to N reference pictures for prediction, where N is a positive integer and each reference picture can be represented as a plurality of image segments. The first station encodes the video images and determines prediction parameter data for an image segment in a current reference picture based on a plurality of image segments from previously decoded reference pictures corresponding to time instances on one side of a temporal axis (that is, before or after a given point in time).

The second station then predicts a new video image as function of the decoded video images and the prediction parameter data. The predicted video image includes an image segment predicted, according to one embodiment, selecting at least two spatially-displaced image segments from previously decoded reference pictures corresponding to time instances on the one side of the temporal axis, and forming a predictor signal by combining the selected spatially-displaced image segments.

For transmitting and displaying the video images quickly, another example video conferencing system implemented according to the present invention utilizes a video data compression algorithm and a video image prediction algorithm. Using this compression algorithm, the transmitting station (in this instance, the local station) initially compresses the images as a relatively small data packet for efficient transmission over the communications channel in a relatively short period of time. The data packet is received by the remote video conferencing station and is decoded, decompressed and may be then displayed by the second station.

Using the video image prediction algorithm, multiple reference pictures can be used to improve coding efficiency and thereby compensate for video image degradation. This is especially useful in applications of repeated images, such as when the video camera is shaking or, as with many video conferencing situations, when the captured image is a participant's head that is moving repetitively between previously-displayed positions.

FIG. 1 illustrates, in block diagram form, a digital video coding system utilizing a prediction algorithm according to the present invention and useful as part of the above-described video conferencing application. The input to the system is a digital video signal, for example, as provided by a video camera (not shown). The digital video signal is presented to a video coder 112, which is arranged to use a conventional digital video compression coder. In one example embodiment, the coder 112 is a hybrid coder. The coder 112 receives the input video signal at a summing node, or summer 114, which sums the digital video signal with a motion compensated frame. The output of the summer 114 is processed using a discrete cosine transformer (DCT) 118 to provide image blocks as encoded signals manifesting reduced spatial redundancy. From the DCT 118, these encoded signals are then processed using a quantizer 120.

As discussed herein, "image segment" generally refers to an arbitrary portion of an image. In some applications, these terms respectively correspond to "block" and "frame." In other applications, these terms carry more general meanings.

The motion compensated frame is provided from a multiple-hypothesis motion-compensated predictor 116, which is in turn responsive to a multiple frame motion estimator 124 and the output of another summer 128. The multiple frame motion estimator 124 determines motion parameters for the coder 112 and the decoder 122 as a function of the video input signal.

The summer 128 sums the output of the quantizer 120 and the motion compensated frame, as provided by the multiple-hypothesis motion-compensated predictor 116. In response, the summer 128 produces a reconstructed frame as an input for the multiple-hypothesis motion-compensated predictor 116 for the purpose of generating the next motion compensated frame. The quantized output signal is provided to an inverse discrete cosine transformer (IDCT) 126, which inverses the transformation of the DCT 118, as would a similarly-operating IDCT at a decoder station, such as IDCT 132 of the decoder 122 of FIG. 1. The predictor 116 produces the motion parameters for effecting completion of the feedback at coder 112, and for providing the same information to the decoder 122.

The quantized signals provided by quantizer 120 are then transmitted to a decoder 122 along with motion parameters, for example, motion vector and time delay information. Transmission from the coder 112 to the decoder 122 can occur using a variety of communication-type couplers including but not limited to conventional short-distance communication schemes (e.g., local-area networks, direct wiring, RS422-type wiring) and more remote connecting schemes such as multiplexer-modem/modem-demultiplexer type devices 140 and optic-type equipment (not shown).

At the decoder 122, the similarly-operating IDCT 132 receives the output of the coder 112 to inverse the transform provided by the coder 112. Using another summer 134 and the multiple-hypothesis motion-compensated predictor 136, a similar feedback signal and the motion parameters from the coder 112 are provided to effect an accurate video out signal as depicted at the output port of summer 134.

Figure 2A:
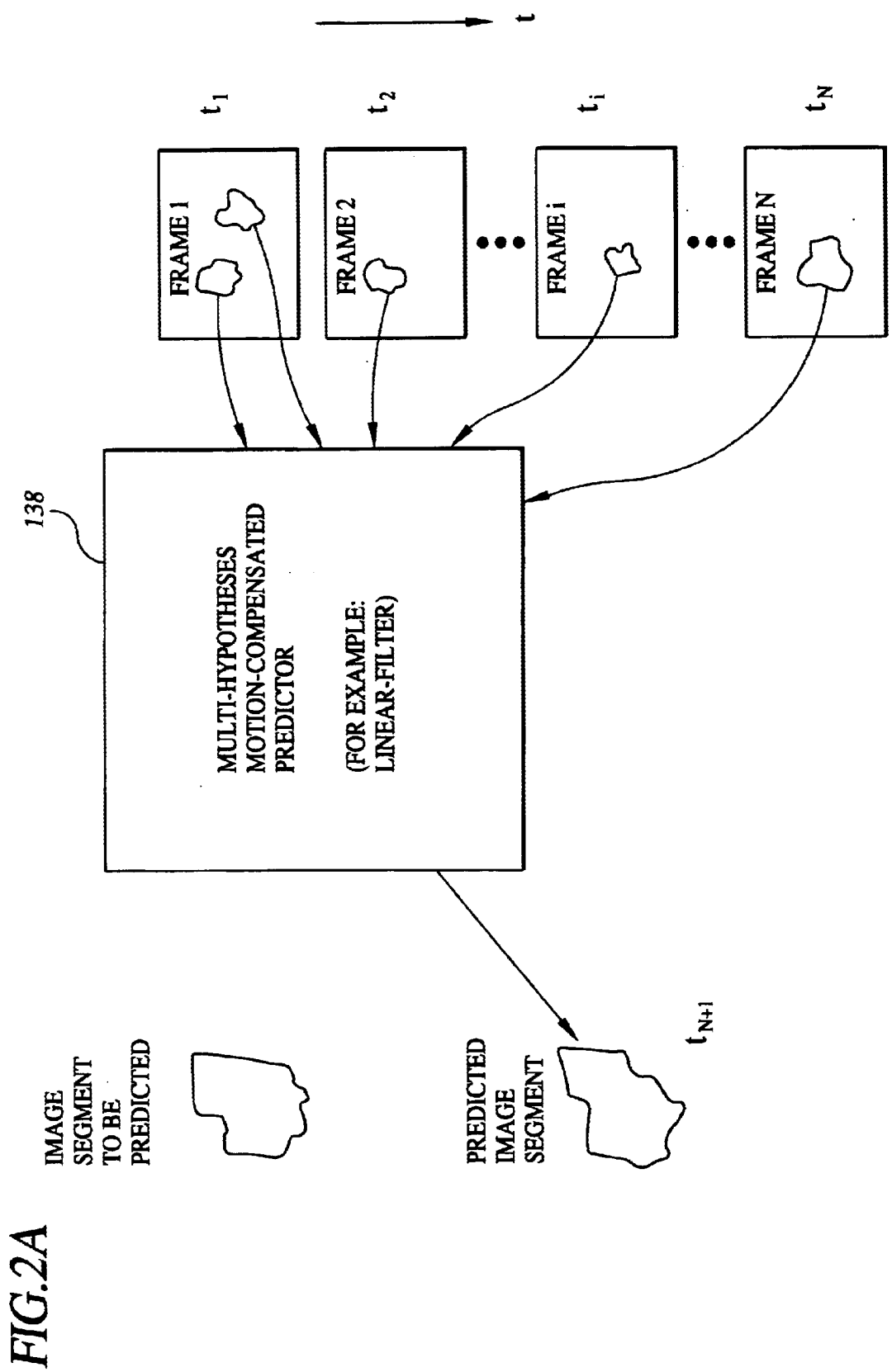
FIGS. 2A, 2B and 2C are conceptual diagrams of motion-compensated prediction, according to example embodiments of the present invention.

FIG. 2A conceptually illustrates the operation of a motion compensated predictor 138, according to the present invention, that can be used as the predictor 116 or 136 of FIG. 1. In this example illustration, the predictor 138 processes an image segment, or block (as the case may be), from a current frame and generates as an output a predicted image segment (or block) based on N reference frames available to both the sending (or encoding) and receiving (or decoding) stations. Instead of attempting to generate a predicted image segment (or block) based on a single image segment, the predictor 138 employs multiple image segments from previously decoded frames. In FIG. 2A, these multiple image segments are processed from previously decoded frames from the past, relative to the current frame for which the image segment is about to be predicted for a current frame, at time $t_{n+1}$. These previously decoded frames are: Frame 1 from time $t_1$, Frame 2 from time $t_2$ . . . Frame N from time $t_N$.

In this particular embodiment, the predictor 138 addresses each image segment in the corresponding frame by its spatial displacement and frame reference parameters. Using an iterative algorithm, the predictor 138 weights each image segment used in the prediction process and then combines the image segments linearly to obtain the predicted image segment. In one implementation, the result is a significant improvement with prediction gains up to 3 dB in prediction error.

Adopting the term "hypothesis" to refer to a segment or block, the predictor 138 can be referred to as a multi-hypothesis motion-compensated predictor. In any event, the predictor 138 can be implemented in a variety of digital processing forms, including but not limited to a discrete circuits and programmable digital signal processors. The predictor 138 can also be viewed as a linear filter operating, for example, as described below.

According to a specific embodiment of the present invention, a rate penalty is used to combine several spatio-temporally displaced hypotheses. For transmission, relative spatio-temporal positions of hypotheses $(\Delta_{x_i}, \Delta_{y_i}, \Delta_{t_i})$ are assigned to spatio-temporal displacement codewords. For the weighted superposition, all hypotheses are considered equally, independent of their spatio-temporal position. The predictor coefficients are not transmitted for each block.

This extension uses a rate-distortion framework, with the average quality of the prediction constrained by the average rate of the spatio-temporal displacement code.

Rate-Distortion Optimized Motion-Compensated Prediction

In block-based motion-compensated prediction, each block in the current frame is generally approximated by a spatially-displaced block from the previous frame. Each s×s block is associated with a vector in a $s^2$-dimensional space. Original blocks are represented by the random variable S with its samples s from the vector space.

The quality of the prediction is measured by the average distortion between original blocks S and predicted blocks Ŝ. The algorithm uses squared Euclidean distance in the vector space to determine the distortion between two samples, as follows:

$$D = E\{\|S - \hat{S}\|_2^2\} \qquad \text{(Equation 1)}$$

The blocks are coded with a displacement code B. Each displacement codeword provides a unique rule indicating how to compensate the current block-samples. The average rate of the displacement code is determined by its average length.

$$R = E\{|B|\} \qquad \text{(Equation 2)}$$

Optimal rate-distortion prediction minimizes average prediction distortion for a given average displacement rate. For the example discussion herein, the constrained problem can be restated as weighting the average rate by the Lagrange multiplier λ. For further information concerning the Lagrange multiplier, reference may be made to P. A. Chou, T. Lookabough, and R. M. Gray, "Entropy-Constrained Vector Quantization", *IEEE Transactions on Acoustics, Speech and Signal Processing*, vol. 37, pp. 31–42, January 1989, incorporated herein by reference. The resulting functional can be referred to as "the average rate-distortion measure J." To achieve rate-distortion optimal prediction, the average rate-distortion measure is minimized for constant λ.

$$J(\lambda)=E\{||S-\hat{S}||_2^2\}+\lambda E\{|B|\} \quad \text{(Equation 3)}$$

Block-based Multi-hypothesis Motion-compensated Prediction

Also in accordance with the present invention, the predictor 138 of FIG. 2A employs a block-based model for multi-hypothesis MCP using n blocks $c_1, \ldots, c_n$, from previous frames to predict one block in the current frame. The blocks that are available for prediction are called hypotheses. The n hypotheses that predict the block are grouped to a multi-hypothesis or n-hypothesis c. The predicted block is determined by linear combination of the individual components $c_v$. Coefficients $h_v$, determine the weight of each component for the predicted block.

The predicted block can be represented mathematically as follows:

$$\hat{S} = \sum_{v=1}^{n} c_v h_v = (c_1 \ldots c_n)\begin{pmatrix} h_1 \\ \vdots \\ h_n \end{pmatrix} = ch \quad \text{(Equation 4).}$$

Figure 2B:
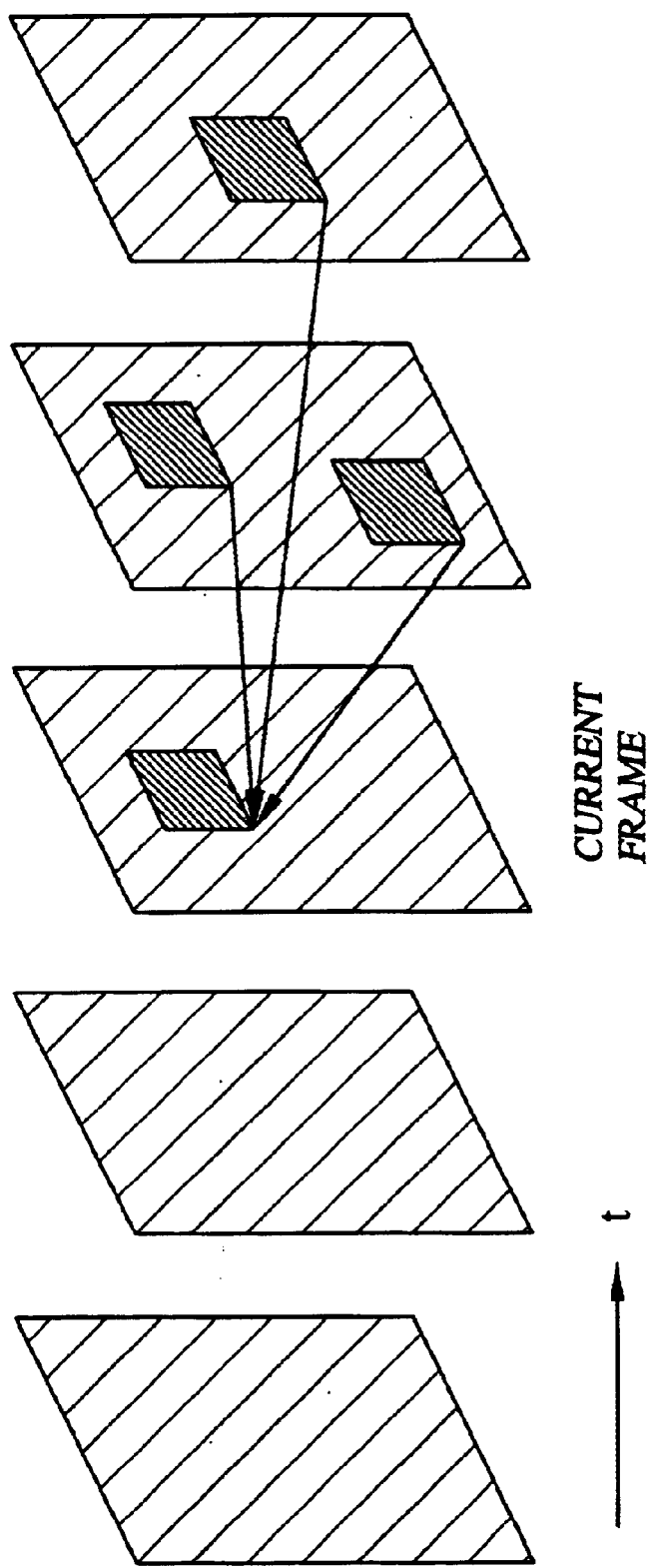
Figure 2C:
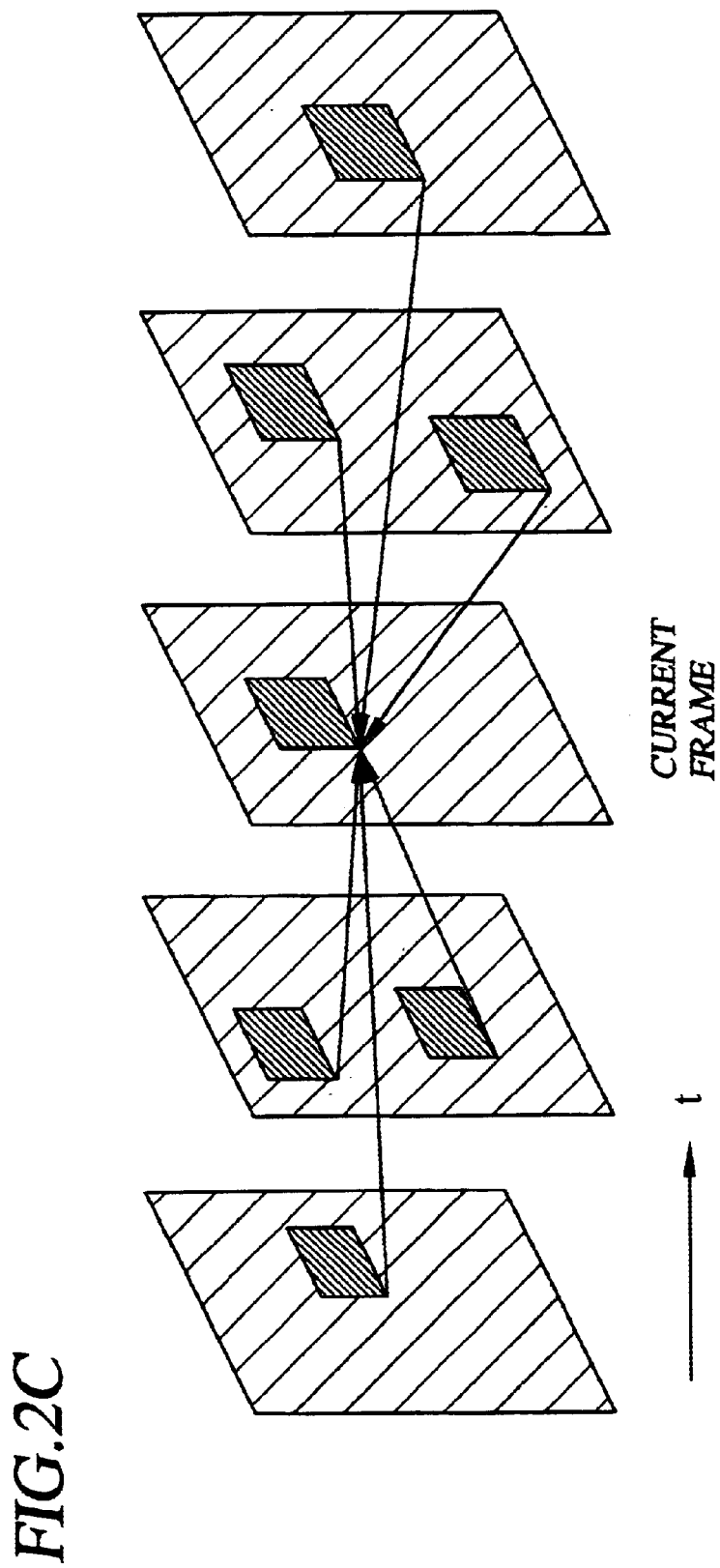

Also in accordance with the present invention, image segments can be combined by taking spatially and temporally displaced image segments from frames other than those corresponding to past frames, relative to the subject frame for which an image segment is being predicted. FIG. 2B illustrates an implementation, according to the present invention, of combining multiple spatially and temporally displaced image segments taken from future frames. FIG. 2C illustrates another implementation, according to the present invention, of combining multiple spatially and temporally displaced image segments, three taken from future frames and three taken from past frames. More generally, this process involves selecting at least two spatially-displaced image segments from previously decoded reference pictures corresponding to time instances on one side of a temporal axis, and then combining the selected spatially-displaced image segments.

In a two-hypothesis vector relationship for a two-dimensional block, the individual components of such a relationship do not necessarily approximate the original block. Consistent with the present invention, such an approximation is accomplished by combining the two components. An example of a linear combination is through weighted superposition. This can be achieved, according to a particular embodiment of the present invention, to extend the predictive power of blocks available for prediction and to cause a dependence among the components of an n-hypothesis.

Motion-compensated Prediction Addressed as a Vector Quantization Problem

It has also been discovered in connection with the present invention that the motion-compensated prediction can be considered as a vector quantization problem. For multi-hypothesis motion-compensated prediction according to an embodiment of the present invention, known algorithms can be used for vector quantization. According to an example embodiment of the present invention, this design problem is solved in an iterative manner. A particular implementation, according to the present invention, uses the *Generalized Lloyd algorithm* (GLA) in conjunction with *Entropy Constrained Vector Quantization* (ECVQ) to address the design problem in an iterative manner. Example descriptions of these processes are described in "An Algorithm for Vector Quantizer Design," Y. Linde, A. Buzo, and R. M. Gray, IEEE TR-COM, Vol,: COM-28, No. 1, Jan. 1980, pp. 84–95, incorporated herein by reference. Another particular implementation, according to the present invention, uses a unique fast-search process using a codec to compare previously decoded frames in a "sliding window." For example, if the codec's long-term memory buffer includes M frames, a decoded frame is searched M times in the block motion estimation of M successive frames. Therefore, any pre-computation attached to a decoded frame in the long-term memory can be used M times to speed up the motion estimation. A particular implementation approach is described in greater detail in a paper attached hereto in appendix form: "Fast Search For Long-Term Memory Motion-Compensated Prediction," by Thomas Wiegand, Bo Lincoln and Bernd Gerod. The subject matter disclosed therein is incorporated herein by reference.

The multi-hypothesis motion-compensated predictor of FIG. 1 can be represented to correspond to a quantizer model. The quantizer model can be solved by first attempting to minimize the average rate-distortion measure. The average rate-distortion measure can be rewritten as shown in Equation 5 to determine the optimal predictor:

$$J(\alpha,\beta,\gamma,\lambda,S)=E\{||S-\beta\cdot\alpha(S)||_2^2+\lambda|\gamma\cdot\alpha(S)|\} \quad \text{(Equation 5).}$$

Where the variables in the equation respectively represent: α—an estimation of the multi-hypotheses C from the original blocks, S; β—the weighted superposition; γ—the variable length code for transmission of the multi-hypothesis prediction code; λ—a multiplier; S—the original blocks. For additional information concerning interpolative prediction of video reference may be made to S. W. Wu and A. Gersho, "Joint Estimation of Forward and Backward Motion Vectors for Interpolative Prediction of Video", *IEEE Transactions on Image Processing*, vol. 3, no. 5, pp. 684–687, September 1994.

For given distribution of the original blocks SC and constant Lagrange multiplier $\Sigma_3$, the optimal predictor incorporates the optimal mappings α, β, and ε which satisfy $$\min_{\alpha,\beta,\gamma} J(\alpha, \beta, \gamma, \lambda_c, S_c) \quad \text{(Equation 6).}$$

According to the present invention, the iterative design algorithm for solving Equation 6 includes three steps. The distribution of the original blocks $S_c$, as well as the Lagrange multiplier $\beta_c$, are estimated or guessed for initialization.

The first step determines the optimal multi-hypothesis c=I(s) for given mappings $\beta_c$ and $\gamma_c$.

$$\min_{\alpha} E\{||S_c - \beta_c \circ \alpha(S_c)||_2^2 + \lambda_c|\gamma_c \circ \alpha(S_c)|\} \Rightarrow \alpha(s) = \quad \text{(Equation 7).}$$

$$\arg \min_{c}\{||s - ch_c||_2^2 + \lambda_c|\gamma_c(c)|\}$$

Equation 7 is the biased, nearest neighbor condition familiar from vector quantization with a rate-constraint, and a multi-hypothesis "c" is found by minimizing a distortion measure weighted against a rate measure by a multiplier $\lambda$, where $\lambda$ is greater than or equal to zero.

The second step provides the optimal mapping y for given mappings $\alpha_c$, and $\gamma_c$. A constant mapping $\alpha_c$ assures a constant distribution of the multi-hypotheses $C_c$.

$$\min_{\gamma} E\{\|S_c - \beta_c \circ \alpha_c(S_c)\|_2^2 + \lambda_c|\gamma \circ \alpha_c(S_c)|\} \Rightarrow \min_{\gamma} E\{|\gamma(C_c)|\} \quad \text{(Equation 8)}.$$

Equation 8 postulates a minimum average codeword length for the optimal conditional code. For a finite number of multi-hypothesis displacements, the Huffman algorithm solves this optimization.

The third step determines the optimal multi-hypothesis superposition for given mappings $\alpha_c$ and $\gamma_c$. Equation 9 is the Wiener problem for the optimal conditional predictor coefficients.

$$\min_{\beta} E\{\|S_c - \beta \circ \alpha_c(S_c)\|_2^2 + \lambda_c|\gamma_c \circ \alpha_c(S_c)|\} \Rightarrow \quad \text{(Equation 9)}.$$

$$\min_{h} E\{\|S_c - C_c h\|_2^2\}$$

Optimal Hypothesis Selection Algorithm

As discussed above in connection with the present invention, n hypotheses are found for each predicted block. The dependence among these hypotheses advantageously uses a joint solution for the estimation problem.

Each hypothesis is addressed by a spatio-temporal displacement $(\Delta_{x_v}, \Delta_{y_v}, \Delta_{t_v})$. This address is relative to the position of the predicted block. Allowing a search space of size $[-a, a] \times [-a, a] \times [-m, -1]$, a full search algorithm implies a complexity of $$P_f = [m(2a+1)^2]^n \quad \text{(Equation 10)}$$

search positions. For practical parameters (a=15, m=10, n=4), the complexity of $P_f = 8.5 \cdot 10^{15}$ search positions can be too computationally demanding for many processing systems and/or applications.

Also according to the present invention, searching the complete space can be avoided by successively improving n optimal conditional solutions. Convergence to a local optimum is realized using an iterative algorithm that prohibits an increase of the error measure. A relative decrease of the rate-distortion measure of less than 0.5% indicates practical convergence. According to the present invention, a locally optimal solution for Equation 7 above is found using an iterative process, and may be referred to herein as *Optimal Hypothesis Selection Algorithm* (OHSA). Such a process is exemplified in FIG. 3.

The OHSA is initialized with n hypotheses by applying the rule of *Splitting One Hypothesis*, in which a single hypothesis is searched and this single hypothesis is assumed to be a multiple (n-) hypothesis set. The computational demand of finding a single hypothesis (or 1-hypothesis) is rather moderate. This optimal 1-hypothesis is then repeated n times to generate the initial n-hypothesis.

For each n-hypothesis component in each iteration, OHSA performs a full search within a conditional search space in which an optimal conditional n-hypothesis component is to be found. The size of the conditional search space $[-b, b] \times [-b, b] \times [-b, b]$ affects the quality of the local optimum and the complexity of the algorithm, which is $$P_f = m(2a+1)^2 + In(2b+1)^3 \quad \text{(Equation 11)}$$

search positions for I iterations. For practical parameters (a=15, m=10, n=4, b=4, I=3), the complexity is reduced by factor $4.6 \cdot 10^{11}$ to $P_f = 1.8 \cdot 10^4$ search positions compared to the full search complexity using equation (10) above.

OHSA does not determine the optimal number of hypotheses of a multi-hypothesis. The optimal number of hypotheses in the rate-distortion sense depends significantly on the rate constraint. For a given maximal number N, the optimal number of hypotheses is determined for each original block by running the OHSA for all numbers n from 1 to N and picking the one that minimizes the rate-distortion measure.

$$\min_{n:1 \le n \le N} \{\|s - c^{(n)}h^{(n)}\|_2^2 + \lambda|\gamma(c^{(n)})|\} \quad \text{(Equation 12)}.$$

Optimal Predictor Coefficients

The third step in the iterative design algorithm, according to the present invention, solves the well-known Wiener problem of predictor design. Since our predictor preserves the expected value of the original block, i.e. $E\{S\} = E\{S^\wedge\}$, the Wiener problem is expressed in covariance notation, as follows:

$$\min_{h} \{C_{ss} - 2h^T C_{cs} + h^T C_{cc} h\} \quad \text{(Equation 13)}$$

$C_{SS}$ is the scalar variance of the original block, $C_{CC}$ the n×n covariance matrix of the hypotheses, and $C_{CS}$ the n×1 covariance vector between the hypotheses and the original block.

For video signals, is desirable to constrain additionally the sum of the prediction coefficients $h_v$ to one. With the vector $u^T = (1, 1, \ldots, 1)$ of dimension n, this can be expanded as $u^T h = 1$. A Lagrangian approach to the constrained Wiener problem leads to the predictor coefficients $$h = C_{cc}^{-1}\left(C_{cs} - \frac{u^T C_{cc}^{-1} C_{cs} - 1}{u^T C_{cc}^{-1} u} u\right). \quad \text{(Equation 14)}$$

For the predictor design, 18 training sequences are used with each covering 10 seconds of video in QCIF resolution. The rate is 7.5 frames per second. The sequences are: Akiyo, Bream, Car Phone, Children, Coastguard, Container Ship, Fun Fair, Hall Monitor, Mobile, News, Salesman, Sean, Silent, Stefan, Table Tennis, Total Destruction, Tunnel und Weather.

In one application, convergence of the predictor coefficients for an iterative predictor design is realized. The application is for 2 hypotheses and 3 hypotheses, respectively, and each for the training sequences (QCIF, 7.5 fps), 16×16 blocks, $\lambda=100$, and m=10. Fixed length codebooks are used for initializing the design algorithm. In order to demonstrate convergence of predictor coefficients, a uniform coefficient initialization $h_v = 1/n$ is compared to an arbitrary initialization $g_v$.

Performance of Example Predictor Embodiments

The rate-distortion performance has been evaluated for the designed predictors ($\lambda=100$) by predicting the test sequence Foreman for various Lagrange multiplier (25, 50, 100, ..., 1600). The test sequence is not in the above training set.

Also in connection with the present invention, for certain applications it has been observed that more blocks are decomposed into N=4 hypotheses and less blocks into n<N hypotheses by increasing the rate.

Multi-hypothesis motion compensated prediction is a very promising technique that can yield significant bit-rate savings for future video coding algorithms. Increasing the accuracy of MCP from integer-pel to half-pel provides gains from 0.7 dB to 1 dB in prediction error. However, increasing the number of hypotheses from n=1 to n=4 provides gains of more than 2.2 dB in prediction error.

Figure 4:
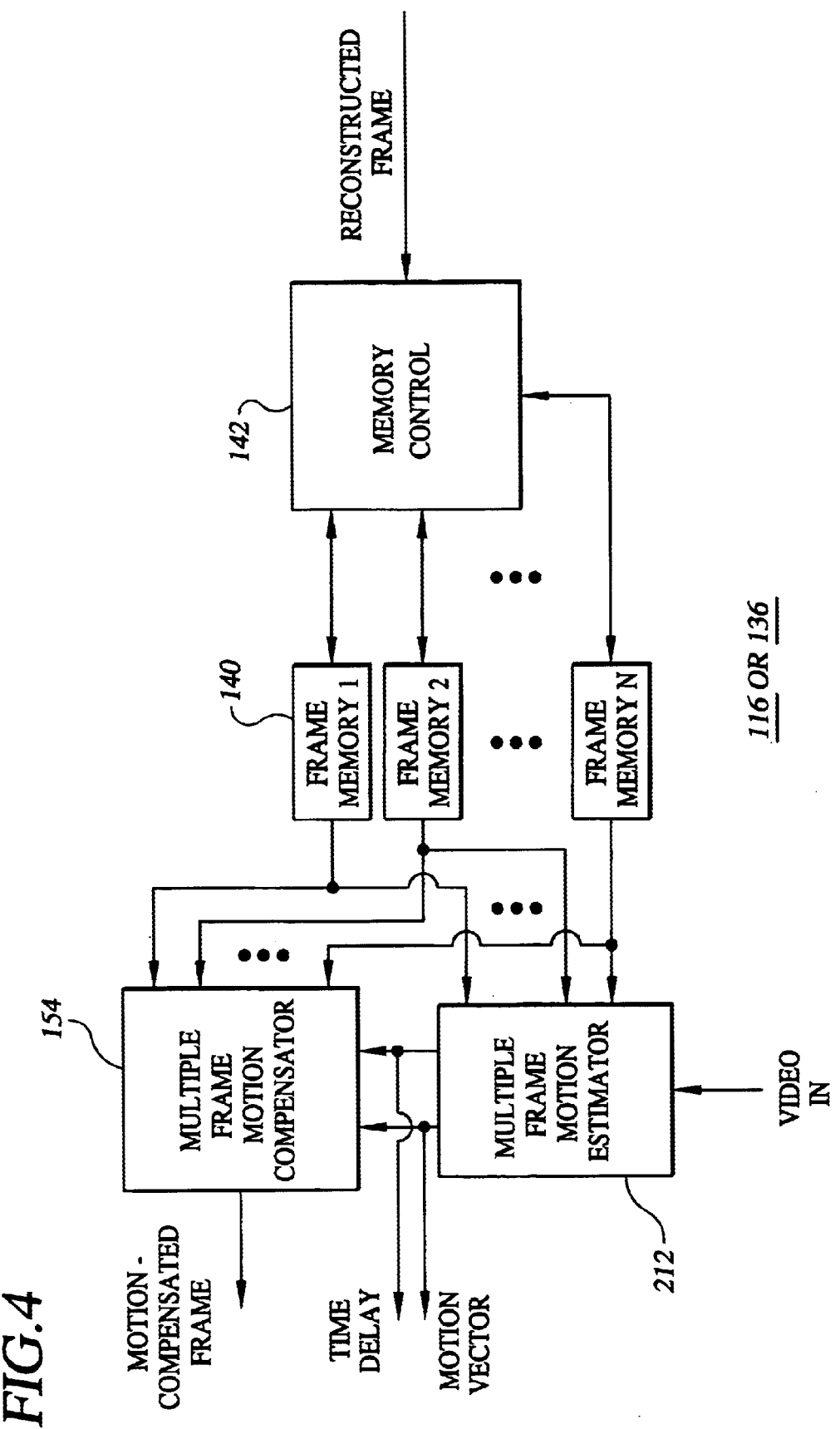
FIG. 4 illustrates an example embodiment of a predictor, according to the present invention.

Referring now to FIG. 4, an example implementation of the multiple-hypothesis motion-compensated predictor 116 or 136 of FIG. 1 is shown. In this embodiment, the multiple-hypothesis motion-compensated predictor 116 or 136 includes a memory control 142, frame memories 140, and a multiple frame motion compensator 154. The multiple-hypothesis motion-compensated predictor produces a motion compensated frame as a function of motion parameters that are determined by the motion estimator 212 at the first station and received at the second station.

The depicted multiple frame motion compensator 154 is arranged to function as a frame selector and a single frame motion compensator. The frame selection outputs a selected frame from one of the frame memories 140. The single frame motion compensation is responsive to the motion parameters and outputs the motion-compensated frame.

The motion parameters carry the information used by the multiple frame motion compensator to produce the motion-compensated frame given the frame memories. The motion parameters include the frame selection parameters used to reference an image in the frame memories, and the spatial displacement parameters used to reference image samples that are spatially displaced in the referenced frame in accordance to the reference coordinate system.

Different applications can dictate different implementations for the specific information represented by the frame selection parameter. For example, for applications in which the frame memories are arranged in the sliding window approach, the frame selection parameter corresponds to a time delay. For other applications, the spatial displacement parameters can correspond to spatial displacements, for example, where the multiple frame motion compensation utilizes a translational motion model as used in H.263 and MPEG-4. Where the multiple frame motion compensation utilizes an affine or bilinear motion model, the spatial displacement parameters can correspond to polynomial motion coefficients.

For each of the above applications, the multiple frame motion compensation unit decodes the motion parameters into a frame selection parameter and a spatial displacement value to determine the position in the frame memories from which the motion-compensated prediction value is calculated. Where this position coincides with an image sample, this sample is copied. Where this position does not coincide with an image sample the motion-compensated prediction value is calculated by interpolating between surrounding image samples.

The image to be encoded is in general segmented into 1 to S segments, where S is a positive integer. For most applications, these segments are assigned motion parameters.

This example implementation of the interframe predictor uses a number of frame memories 140 that are arranged using a memory control 142. The memory control 142 may work in several modes of operation. In one mode of operation, a sliding window over time may be accommodated by the memory control unit. Using this approach, past decoded and constructed frames, starting with the immediately preceding one and ending with the frame which is decoded M time instants before, are collected in the frame memories 140, individually designated Frame Memory 1 to Frame Memory M. Alternatively, the set of past decoded and reconstructed frames may be subsampled and buffered in the frame memories using a scheme presumed by encoder and decoder. In general, several memory control modes of operation may be defined and the one which is used may be negotiated between encoder and decoder.

Figure 5:
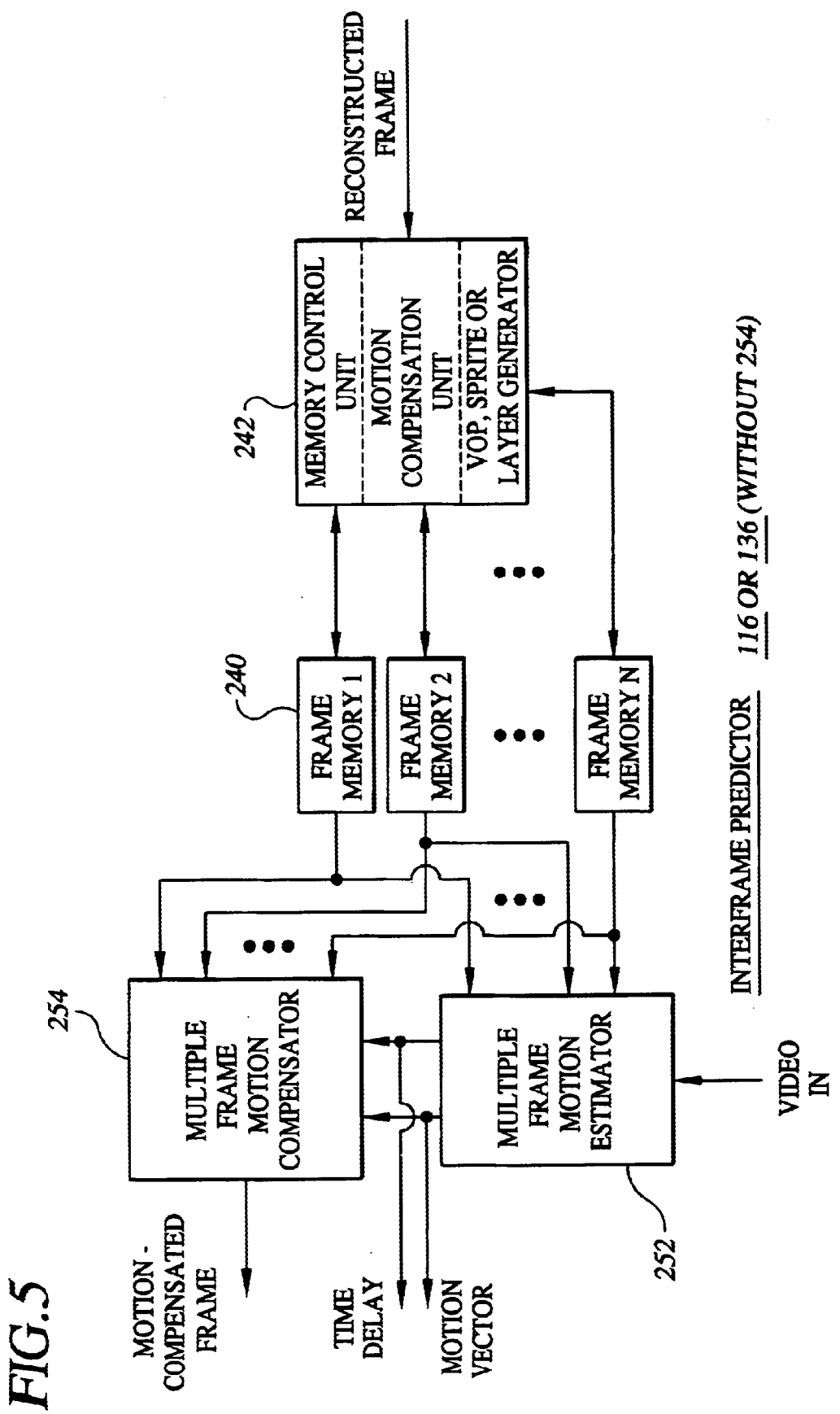
FIG. 5 illustrates another example embodiment of a predictor, according to the present invention.

FIG. 5 illustrates another embodiment of an interframe predictor, also in accordance with the present invention and with reference numerals that correspond to the smililarly-named blocks of FIG. 4 (e.g., 254 to 154). This embodiment of FIG. 5 uses a number of frame memories that are arranged using the memory control and in addition to that using a motion compensation unit. The frames do not need to be of equal size. Reference coordinate systems are given in correspondence to the video input signal. The motion parameters which are input to the memory control and motion compensation unit are used to generate reference frames according to polynomial motion models, for instance, affine or bilinear motion models. Techniques employed as for Sprites or GMC may as well be utilized to generate reference frames for arrangement in the frame memories. Common with all these techniques is that the polynomial motion models have to be transmitted as side information.

The frame memory may also constitute frames generated by Background Memory estimators. Other layers than the background may also be used to generate reference frames. As in the previously described paragraph, the frames in the frame memory do not need to be of equal size. For frames referring to layers, reference frames may also be generated relating to video object planes (VOPs), as specified in MPEG-4. The frame memory may constitute, for instance, a complete video object (VO) which itself may contain several VOPs.

The multiple frame predictor may be block-based (conforming to H.263 or MPEG-4) or it may be region-based or a combination of both. The region-based multiple frame predictor constitutes the capability to perform motion-compensated prediction using polynomial models, which are, for instance, affine or bilinear motion models. In most cases, the regions are arbitrarily shaped and of larger size than the blocks in H.263 or MPEG-4, and their contours have to be transmitted as side information. However, the implementation discussed herewith does not place such restrictions.

The variable length codes tables to represent the motion parameters that can be used to represent and decode the spatial displacement and time delay for each image sample are generated by a using a set of training sequences, which statistically represents the set of video sequences the application is targeting. The set of training sequences is encoded at a presumed frame rate. The encoding can be implemented by predicting the original video frames given the multiple frame prediction application tools. Alternatively, the encoding method can implemented by integrating the multiple frame prediction apparatus and method into a hybrid video encoder.

In a general implementation, the encoding method is a part of the video encoder or the video encoder itself for which the variable length codes are to be designed. For the above encoding methods, the Lagrange parameter is adjusted to achieve the bit-rate of the motion parameters and/or the other codes of the hybrid video bit stream as it is to be expected for the application targeted. The tables are initialized with fixed length codes. While encoding the set of training sequences by one of the encoding methods described above, histograms are gathered on the motion parameters. These histograms are used to generate variable length code tables, for instance, by a Huffman code generator. These variable length code tables are employed in a next encoding, histogram gathering and variable length code generating step. This loop is continued until a convergence bound is reached, i.e., the changes in the overall Lagrangian cost for all training sequences becomes small.

The prediction of the motion parameters and/or the switching between variable length code tables based on past determined codes in order to lower the bit-rate of the motion parameters is strongly dependent on the multiple frame prediction apparatus.

The relation to the multiple reference frame arrangement is with respect to the prediction and/or the switching between variable length code tables based on past determined codes with respect to the frame selection parameter. In case the sliding window approach is employed, the frames are already arranged in an order which improves prediction efficiency of the frame selection parameter. Otherwise, the frame arrangement in the frame memories should follow an ordering which minimizes the bit-rate needed to transmit the motion parameters.

The relation to the single frame motion compensation unit is with respect implemented spatial motion compensation capability and it affects the prediction determined codes with respect to the spatial displacement parameters.

Example approaches for predicting the motion parameters include: linear or affine finite impulse response (FIR) filters; median filters; and other statistical prediction techniques, such as those based on codes relating to the region of support (ROS), that predict the current motion parameters simultaneously at the first and second station.

The motion parameters may be predicted by one of the above-mentioned techniques. The predictor can be used by subtracting it from the frame selection parameters and transmitting the resulting difference to the second station by means of a variable length code table. The predictor may as well be used to constitute the condition for switching between various variable length code tables. All variable length code tables can be determined by the method described above.

The task of a video encoder is very often formulated as to minimize the distortion introduced to the video data while spending only a certain (presumed) amount of bits given the architecture of the video decoder. In general, the encoder has to search all possible parameter combinations in order to determine the best setting. To circumvent this exhaustive search, an unconstrained formulation may be used.

For finding the motion parameters and the frame selection parameter, the search is conducted by minimizing a "Lagrangian" cost function. The Lagrangian cost function constitutes a distortion term being weighted against a rate term by multiplying the rate term with a Lagrange parameter. The value starts with the candidate that is assigned the smallest amount of bit-rate, i.e., being the most probably candidate to outcome the motion search. The Lagrangian costs of this first candidate are computed and assumed to be minimum cost. Then, all remaining candidates in the order of increasing bit-rate are checked for their Lagrangian cost being less than the minimum cost. In case a candidate has lower cost than minimum cost, its cost is assumed to be minimum cost instead and the search is continued until the complete parameter set is checked.

The distortion term is given by a metric in euclidean signal space, or a function of this metric and/or another measure obtained from the video input signal and the frame memories. The metric may be the sum of the absolute differences or the sum of the squared differences between the image segment to be predicted and the candidate segment that is computed by performing motion compensation using the spatial displacement together with the frame selection parameter under consideration. A function of this metric and/or another measure obtained from the video input signal and the frame memories may approximate the distortion after computing the complete hybrid coding loop.

The rate term can be computed by a table lookup for the number of bits needed to transmit the motion parameters and the frame selection parameter given a predictor. The predictor may be computed by various techniques. Approaches for predicting the motion vectors include: linear or affine finite impulse response (FIR) filters, median filters, and based on a Finite State Machine, switching of codebooks.

The VLCs for the spatial displacement and the frame selection parameter are generated in a rate-constrained design procedure for the applied prediction techniques. In this context, the VLCs are initialized with fixed length codes. The encoding of a pre-selected set of video sequences is performed using the video coder for which the VLCs are to be designed. After coding the set of pre-selected video sequences, the accumulated occurrences for the motion parameters and the frame selection parameter are put into a standard Huffman VLC generator obtaining new VLCs for the spatial displacement and the frame selection parameter according to the Huffman algorithm. The encoding step, together with the VLC update using the Huffman algorithm, is repeated until a convergence bound is reached. In addition, in the FIR filter case, the filter coefficients of the predictor are computed by gathering auto- and cross-correlation data on the motion and frame selection parameters. Based on these data, the Wiener equations are solved for each iteration computing the prediction filter for the next iteration.

The linear (affine) predictor may be a vector predictor, i.e., predicting all motion parameters and the frame selection parameter jointly, or a scalar predictor, i.e., predicting all separately. The median filter predictor is computed similarly to the H.263 recommendation for motion parameters and the frame selection parameter. Also, a vector median may be employed for joint prediction. The Finite State Machine-switching of codebooks approach uses the H.263 median or other prediction technique to determine the conditions for switching between codebooks which are designated using the algorithm described above.

The rate term may also be added an estimation of the rate needed to transmit the quantized prediction error signal. This estimation may be based on a function computed from the distortion metric and/or another measure obtained from the video input signal and the frame memories.

The above-described multiple reference picture approach can be integrated into an H.263 video codec, using the H.263 inter-prediction modes INTER, INTER-4V, and UNCODED extended to long-term memory MC. The UNCODED mode is an INTER mode for which the COD bit indicates copying the macroblock from the previous frame without residual coding, as is discussed in ITU-T Recommendation H.263, "Video Coding for Low Bitrate Communication," Draft, December 1995. The INTER and UNCODED mode are assigned one code word representing the variable time delay for the entire macroblock. The INTER-4V utilizes four time parameters each associated to one of the four 8×8 motion vectors.

The H.263 coder and the long-term memory coder are operated using a modified encoding strategy as utilized by the TMN-2.0 coder, which is the test model for the H.263 standard. The TMN-2.0 codec is available via anonymous ftp to bande.nta.no. The encoding strategy differs for the motion estimation and the mode decision, where the instant approach is motivated by rate-distortion theory.

In principle, the problem of optimum bit allocation to the motion vectors and the residual coding in any hybrid video coder can be viewed as a non-separable problem requiring a high amount of computation. To circumvent this joint optimization, the problem can be split into two parts: the motion estimation and the mode decision.

The motion estimation is performed as described above using the minimization of the Lagrangian cost function. For each frame the best motion vector using SAD is found by full search on integer-pel positions followed by half-pel refinement. The integer-pel search is conducted over the range [−16 . . . 15]×[16 . . . 15] pels. The impact of overlapped block motion compensation is neglected in the motion estimation.

Given the displacements for a particular mode that may be UNCODED, INTER or INTER-4V, the overall rate distortion costs are computed. The differences between the reconstructed and the original frame, and the rate is computed including the rates of macroblock headers, motion parameters, and DCT quantization coefficients. In case of long-term memory MCP, the motion estimation followed by the mode decision is conducted for each frame in the frame buffer.

Since there are now two Lagrangian cost functions to be minimized, two different Lagrange multipliers are used: one for the motion search ($\lambda_{emotion}$), the other one for the mode decision ($\lambda_{mode}$). Furthermore, the distortion measures differ because of complexity reasons. Hence, the selection of the Lagrange parameters remains rather difficult in the instant coder. In this work, used is the heuristic $\lambda_{emotion}=\sqrt{\lambda_{mode}}$, which appears to be sufficient. The parameter $\Sigma_{mode}$ itself is derived from the rate distortion curve that is computed using the TMN-2.0 H.263 coder.

For further information concerning hardware and/or firmware structures that may be used to implement the compression/decompression and prediction structures and functions described above, reference may be made to U.S. patent application Ser. No. 09/005,053, filed Jan. 9, 1998 now U.S. Pat. No. 6,124,882, incorporated herein by reference and assigned to the instant Assignee.

Accordingly, the present invention provides, among other aspects, a locally optimal design arrangement and method for multi-hypothesis motion-compensated prediction based on image segments. In certain of the example embodiments, the components of a multi-hypothesis are selected from the same search space and their spatio-temporal positions are transmitted by means of spatio-temporal displacement codewords. Constant predictor coefficients are used to combine linearly components of a multi-hypothesis. Further, the present invention provides for an estimation criterion for optimal n-hypotheses, a rule for optimal displacement codes, and a condition for optimal predictor coefficients. Statistically dependent components of a n-hypothesis are determined by the optimal hypothesis selection algorithm, which improves successively n optimal conditional hypotheses. For improved performance, the optimal number of hypotheses for each original block can be determined.

In connection with the present invention, several important observations have been made. Increasing the number of hypotheses from 1 to 2 provides prediction gains of more than 1.5 dB, and the increase from 1 to 4 hypotheses is more than 2.2 dB. OHSA reduces the complexity of the underlying joint optimization problem to a feasible size. Determining the optimal number of hypotheses for each block, additional improvements are achieved. For increasing rate constraint, the average number of hypotheses decreases for each original block. Finally, it has been observed that practically no dominant n-hypothesis component for our training sequences. The optimum predictor coefficients are approximately 1 for n linearly combined hypotheses.

The various embodiments described above are provided by way of illustration only and should not be construed to limit the invention. Based on the above discussion and the references mentioned (each of which is incorporated herein by reference), those skilled in the art will readily recognize various modifications and changes which may be made to the present invention without strictly following the exemplary embodiments and applications illustrated and described herein. For example, above-described embodiments can be modified to accommodate, and/or directly combined with, the teachings set forth in the attached articles, by the named inventors, respectively entitled: "Entropy-Constrained Linear Vector Prediction for Motion-Compensated Video Coding," and "A Locally Optimal Design Algorithm for Block-Based Multi-Hypothesis Motion-Compensated Prediction." Such modifications and changes do not depart from the true spirit and scope of the present invention that is set forth in the following claims.

What is claimed is:

1. For use in a compression/decompression communication system between first and second stations, each station having respective sets of multiple reference pictures to permit use of up to N reference pictures for prediction, where N is a positive integer and each reference picture can be represented as a plurality of image segments, a method of predicting an image segment from a candidate set of image segments having unique spatio-temporal positions, comprising:

assessing image segments from the candidate set independent of spatio-temporal position and, in response, selecting at least two of the assessed candidate image segments corresponding to time instances on one side of a temporal axis and spatially-displaced from each other; and forming a predictor signal by combining the selected spatially-displaced image segments.

2. The method of claim 1, wherein after assessing the candidate image segments, weights are assigned to each of the candidate image segments.

3. The method of claim 2, wherein the predictor signal is formed as a function of at least one of: a distortion criteria and a data transmission rate, and wherein forming the predictor signal includes determining a motion vector and time delay information.

4. The method of claim 1, wherein forming the predictor signal includes determining a motion vector and time delay information.

5. The method of claim 2, wherein forming the predictor signal includes determining spatial displacement parameters as polynomial motion coefficients.

6. The method of claim 2, wherein forming the predictor signal includes executing a minimization of a Lagrangian cost function.

7. The method of claim 2, wherein the predictor signal is formed as a function of both a distortion criteria and a data transmission rate.

8. For use in a compression/decompression communication system between first and second stations, each station having respective sets of multiple reference pictures to permit use of up to N reference pictures for prediction, where N is a positive integer and each reference picture can be represented as a plurality of image segments, a method of communicating images predicted from a candidate set of image segments having unique spatio-temporal positions, comprising:

assessing image segments from the candidate set independent of spatio-temporal position and, in response, selecting at least two of the assessed candidate image segments corresponding to time instances on one side of a temporal axis; and forming a predictor signal by combining the selected spatially-displaced image segments.

9. The method of claim 8, wherein after assessing the candidate image segments, weights are assigned to each of the candidate image segments.

10. The method of claim 9, further including communicating video data between first and second stations using said at least two of the candidate image segments along with corresponding delays as side information.

11. The method of claim 9, further including selecting an optimal number of candidate image segments, and communicating the optimal number as part of the side information.

12. The method of claim 9, wherein selection of the optimal number of candidate image segments includes testing various numbers or candidate image segments and selecting the number that minimizes the Lagrangian cost.

13. The method of claim 9, wherein forming the predictor signal includes executing a minimization of a Lagrangian cost function.

14. For use in at least one of first and second stations, each station having respective sets of multiple reference pictures to permit use of up to N reference pictures for prediction, where N is a positive integer and each reference picture can be represented as a plurality of image segments, a compression/decompression communication system, an apparatus for predicting an image segment from a candidate set of image segments having unique spatio-temporal positions, comprising:

means for assessing candidate image segments independent of spatio-temporal position and, in response, selecting at least two of the candidate image segments corresponding to time instances on one side of a temporal axis; and means for forming a predictor signal by combining the selected spatially-placed image segments.

15. The apparatus of claim 14, further includes in means for assigning weights to each of the candidate image segments.

16. The apparatus of claim 15, wherein the predictor signal is formed as a function of at least one of: a distortion criteria and a data transmission rate.

17. The apparatus of claim 15, wherein forming the predictor signal includes determining a motion vector and time delay information.

18. The apparatus of claim 15, wherein forming the predictor signal includes determining spatial displacement parameters as polynomial motion coefficients.

19. The apparatus of claim 15, wherein forming the predictor signal includes executing a minimization of a Lagrangian cost function.

20. The apparatus of claim 15, wherein the predictor signal is formed as a function of both a distortion criteria and a data transmission rate.

21. The apparatus of claim 14, wherein the predictor signal is formed as a function of both a distortion criteria and a data transmission rate.

22. A compression/decompression communication system, comprising:

a first station and a second station, each of the stations having respective sets of multiple reference pictures to permit use of up to N reference pictures for prediction, where N is a positive integer and each reference picture can be represented as a plurality of image segments, where an image segment is predicted from a candidate set of image segments having unique spatio-temporal positions, and each of the stations having: means for assessing candidate image segments independent of spatio-temporal position and, in response, assigning weights to each of the candidate image segments; means for selecting at least two of the candidate image segment corresponding to time instances on one side of a temporal axis; means for forming a predictor signal by combining the selected spatially-displaced image segments; and means, responsive to the forming means, for predicting an image segment.

* * * * *

UNITED STATES PATENT AND TRADEMARK OFFICE
CERTIFICATE OF CORRECTION

PATENT NO.   : 6,807,231 B1
DATED        : October 19, 2004
INVENTOR(S)  : Wiegand et al.

It is certified that error appears in the above-identified patent and that said Letters Patent is hereby corrected as shown below:

Column 6,
Line 53, "$D=E\{\|S-\hat{S}\|_2^2\}$" should read -- $D = E\left\{\left\|S - \hat{S}\right\|_2^2\right\}$ --

Column 7,
Line 10, "$J(\lambda)= E\{\|S-\hat{S}\|_2^2\}+\lambda E\{|B|\}$" should read -- $J(\lambda) = E\left\{\left\|S - \hat{S}\right\|_2^2\right\} + \lambda E\{|B|\}$ --

Column 8,
Line 25, "Gerod" should read -- Girod --.
Line 34, "$J(\alpha,\beta,\gamma,\lambda,S)=E\{\|S- \beta \cdot \alpha(S)\|_2^2+ \lambda| \gamma \cdot \alpha(S)|$" should read
-- $J(\alpha,\beta,\gamma,\lambda,S) = E\left\{\left\|S - \beta \circ \alpha(S)\right\|_2^2 + \lambda|\gamma \circ \alpha(S)|\right\}$ --

Line 47, "SC" should read -- $S_c$ --.
Line 48, "$\Sigma_3$" should read -- $\Sigma_c$ --.
Line 49, "$\epsilon$" should read -- $\gamma$ --.

Column 9,
Line 4, "y" should read -- $\gamma$ --.

Column 12,
Line 13, "smililarly" should read -- similarly --.

Column 15,
Line 33, "($\lambda_{emotion}$)" should read -- $\lambda_{motion}$ --.
Line 37, " $\lambda_{emotion}=\sqrt{\lambda_{mode}}$" should read -- $\lambda_{motion}=\sqrt{\lambda_{mode}}$ --.

Signed and Sealed this

Fifteenth Day of March, 2005

JON W. DUDAS
*Director of the United States Patent and Trademark Office*